United States Patent
Gupta (10) Patent No.: US 7,130,815 B1
(45) Date of Patent: Oct. 31, 2006

(54) METHOD AND SYSTEM FOR CONDUCTING RESERVE REQUEST REVERSE AUCTIONS FOR ELECTRONIC COMMERCE

(75) Inventor: Piyush Gupta, Cupertino, CA (US)

(73) Assignee: Softface, Inc. (a Subsidiary of Ariba, Inc.), Sunnyvale, CA (US)

(*) Notice: Subject to any disclaimer, the term of this patent is extended or adjusted under 35 U.S.C. 154(b) by 418 days.

(21) Appl. No.: 09/715,837

(22) Filed: Nov. 16, 2000

Related U.S. Application Data (63) Continuation-in-part of application No. 09/441,031, filed on Nov. 16, 1999.

(60) Provisional application No. 60/165,819, filed on Nov. 16, 1999.

(51) Int. Cl.
G06Q 30/00 (2006.01)

(52) U.S. Cl. .............................. 705/26; 705/1; 705/27; 705/37

(58) Field of Classification Search .................... 705/1, 705/23, 26, 27, 37, 64
See application file for complete search history.

(56) References Cited

U.S. PATENT DOCUMENTS

| 5,375,055 | A | | 12/1994 | Togher et al. | |
|---|---|---|---|---|---|
| 5,758,328 | A | | 5/1998 | Giovannoli | |
| 5,794,207 | A | * | 8/1998 | Walker et al. | 705/1 |
| 5,826,244 | A | | 10/1998 | Huberman | |
| 5,835,896 | A | * | 11/1998 | Fisher et al. | 705/37 |
| 5,842,178 | A | | 11/1998 | Giovannoli | |
| 5,845,265 | A | | 12/1998 | Woolston | |
| 5,890,138 | A | * | 3/1999 | Godin et al. | 705/26 |
| 5,897,620 | A | | 4/1999 | Walker et al. | |
| 5,905,975 | A | | 5/1999 | Ausubel | |
| 6,014,644 | A | | 1/2000 | Erickson | |
| 6,021,398 | A | | 2/2000 | Ausubel | |
| 6,041,308 | A | | 3/2000 | Walker et al. | |
| 6,044,363 | A | | 3/2000 | Mori et al. | |
| 6,055,519 | A | | 4/2000 | Kennedy et al. | |
| 6,108,639 | A | * | 8/2000 | Walker et al. | 705/26 |
| 6,119,101 | A | | 9/2000 | Peckover | |
| 6,230,147 | B1 | * | 5/2001 | Alaia et al. | 705/37 |
| 6,260,024 | B1 | | 7/2001 | Shkedy | |

(Continued)

FOREIGN PATENT DOCUMENTS

WO     WO 98/10361     3/1998

(Continued)

OTHER PUBLICATIONS

Press release, "King Auction in Reverse"; Electronic Commerce News; Potomac; Nov. 8, 1999 extracted from http://proquest.umi.com on May 22, 2001.*

(Continued)

Primary Examiner—Yogesh C. Garg
(74) Attorney, Agent, or Firm—Blakely, Sokoloff, Taylor & Zafman LLP (57) ABSTRACT

A system of performing reserve price reverse auctions is disclosed. In one embodiment, the reverse auction immediately ends if an offer below the reserve price is received. In another embodiment, the reverse auction continues until the buyer accepts an offer such that transaction with the accepted offer is consummated or a time period expires. If the time period expires and no offer is below the reserve price, then the user select from the received offers. If there is at least one offer below the reserve price and at least one other offer, then the system presents the user with the received offers and gives the user a time period to select one. If the user selects an offer, a transaction with the select offer is consummated. If no offer is selected, then a transaction with the lowest received offer is consummated.

20 Claims, 7 Drawing Sheets

U.S. PATENT DOCUMENTS

| | | |
|---|---|---|
| 6,338,050 B1 | 1/2002 | Conklin et al. |
| 6,366,891 B1 * | 4/2002 | Feinberg ................... 705/37 |
| 6,401,080 B1 | 6/2002 | Bigus et al. |
| 6,408,283 B1 | 6/2002 | Alaia et al. |
| 6,415,270 B1 * | 7/2002 | Rackson et al. ............ 705/37 |
| 6,519,574 B1 | 2/2003 | Wilton et al. |
| 6,553,347 B1 | 4/2003 | Tavor et al. |
| 6,598,026 B1 * | 7/2003 | Ojha et al. ................. 705/26 |
| 6,647,373 B1 | 11/2003 | Carlton-Foss |
| 6,871,190 B1 * | 3/2005 | Seymour et al. ........... 705/37 |
| 2001/0032175 A1 * | 10/2001 | Holden et al. .............. 705/37 |

FOREIGN PATENT DOCUMENTS

| | | | |
|---|---|---|---|
| WO | WO 99/23595 | * | 5/1999 |
| WO | WO 00/10066 | | 2/2000 |

OTHER PUBLICATIONS

Anonymous; "Reverse auction should drive prices down"; Purchasing; Boston; Nov. 4, 1999 extracted from http://proquest.umi.com on May 22, 2001.*

* cited by examiner

METHOD AND SYSTEM FOR CONDUCTING RESERVE REQUEST REVERSE AUCTIONS FOR ELECTRONIC COMMERCE

RELATED APPLICATIONS

This patent application is a continuation-in-part of the patent application titled "Method and System for Conducting Reverse Auctions for Electronic Commerce" filed on Nov. 16, 1999, having Ser. No. 09/441,031. This patent application also claims priority to the provisional patent application titled "Method and System for Conducting Reverse Auctions for Electronic Commerce", filed on Nov. 16, 1999, having Ser. No. 60/165,819.

FIELD OF THE INVENTION

The present invention relates to the field of electronic commerce. In particular the present invention discloses an arrangement and methods for implementing an electronic market wherein various suppliers compete for the business of purchasers requesting a defined set of products.

BACKGROUND OF THE INVENTION

The Internet is a global interconnection of computer networks that share a common set of protocols. Specifically, most computers coupled to the Internet use the well-known Transport Control Protocol layer and the Internet Protocol layer for data communication. The combination of the Transport Control Protocol (TCP) and the Internet Protocol (IP) is commonly referred to as TCP/IP. By sharing a set of nonproprietary well-defined data communication protocols, the Internet allows almost any computer system to communicate with any other computer system.

Sets of higher-level application protocols use the TCP/IP layers for lower level communication. Some of the better-known Internet application protocols include file transfer protocol (FTP), the network news protocol (NNTP), and the simple mail transport protocol (SMTP) for file transfer, discussion groups, and email, respectively.

One particular Internet application protocol, the HyperText Transport Protocol (HTTP) has become the dominant application protocol. The HyperText Transport Protocol (HTTP) was created for sharing HyperText Markup Language (HTML) documents. HyperText Markup Language (HTML) documents may include rich multi-media elements such as text, images, audio, and video. The HTTP protocol and the HTML document format enabled the creation of simple to use but media rich documents that could easily be "browsed". By linking together HTML documents located on various servers throughout the world using embedded hyperlinks, a "World Wide Web" (WWW) of interconnected hypertext documents was created. Due to the simple, yet powerful nature of HTML and HTTP, the World Wide Web (WWW) portion of the Internet has become the most well known form of Internet communication.

The WWW quickly became a new mass media system for information distribution. With the help of advertising support, new media companies have created thousands of news, sports, entertainment, and special interest web sites.

The HTML and HTTP standards have been amended to handle two-way communication. Specifically, an HTTP server may present an HTML "form" to a user's web browser. That HTML form may be filled-in by the user and send back to the HTTP server. Using a processing system often known as Common Gateway Interface (CGI) script, the HTTP server can obtain the information from the returned HTML form. These interactive HTML/HTTP techniques have been used to create commercial WWW sites that can perform financial transactions. Internet-based retailers, stockbrokers, banks, etc now conduct a very large amount of commercial activity. Thus, the Internet has become the new frontier of commerce. Internet based commerce has been growing at an exponential rate during the late 1990s.

Internet based commerce involves a unique set of parameters that cause Internet based commerce to be very different from ordinary storefront based commerce. With the Internet commerce, a transaction can take place between consumer located anywhere and a merchant located anywhere. Furthermore, the computers used during an Internet commerce based transaction may perform a number of functions to facilitate the transaction. For example, the computer systems may be used to search databases for a particular item, determine availability, calculate total costs including tax & shipping, etc.

These specific parameters of Internet commerce have been partially exploited by some Internet merchants to produce shopping experiences that cannot be obtained with storefront merchant. For example, eBay, Inc. (http://www.ebay.com/) has created a large auction site that matches large numbers of individuals with unique items to sell with large numbers of purchasers. The purchasers may search for specific items available for auction using a hierarchical category system or a brute-force search. Thus, by using computer technology, eBay has been able to create a large auction market for individual items.

One difficulty with the eBay market system is that the purchaser must perform a significant amount of work to purchase a designed product. First, the purchaser must locate the desired product. Since there is no consistent set of products available, the purchaser must periodically check back to see if the desired product is available. When a desired product is located, the purchaser must then compete with other purchasers to obtain the desired product.

Even using traditional catalog style Internet retailers is a chore for purchasers. To obtain a product price, a purchaser must visit many different retailer sites to compare prices. Even after visiting several different Internet retailers, the purchaser has a difficult time comparing the various offers since the varying price, shipping, handling, and sales tax values must all be taken into account to adequately compare the offers presented by the different retailers. It would be desirable to have alternate market systems that relieve the purchaser from much of the work required to complete a retail transaction. Thus, creating additional new market systems for Internet based commerce would be desirable.

SUMMARY OF THE INVENTION

An electronic commerce system based upon reverse auctions is disclosed. In the electronic commerce system of the present invention, a reverse auctioneer presents a list of available products to consumers. The products may be present to consumers using a web site. The electronic commerce system then accepts requests for products from consumers. When a consumer requests a particular product, the reverse auctioneer presents the request to a set of distributors to begin a reverse auction. The distributors submit offered prices at which the distributor will sell the particular product. The distributors may submit revised offers as the offer price drops. The reverse auction ends after a predetermined amount of time. After the reverse auction ends, the consumer that made the request receives a list of the best offers from various distributors. The consumer may then elect to purchase the product at a price listed in the list of best offers from the various distributors.

In a set of alternate "reserve price" embodiments, the consumer must specify an acceptable price for a particular desired product known as a reserve price. The consumer is then committed to purchase the particular product if the reverse auctioneer locates a distributor willing to sell at a price at or below the specified reserve price. After receiving the desired product specification and the reserve price, the reverse auctioneer accepts one bid from each distributor.

In a first reserve price embodiment, the reverse auction immediate ends if an offer below the reserve price is received. In a second reserve price embodiment, the reserve price reverse auction runs for a predetermine time period and the lowest offer below the reserve price is selected as the winner. If there is no offer below the reserve price, then the user may be present with the received offers and may accept one.

In a third embodiment, until the purchaser accepts an offer or a predetermined time period expires. If the user accepts an offer, a transaction with the accepted offer is consummated. If the predetermined time period expires and no offer is below the reserve price, then the user may be present with the received offers and may accept one. If there is at least one offer below the reserve price and at least one other offer (above or below the reserve price), then the system presents the user with the received offers and gives the user a limited time period to select one one. If the user selects an offer, a transaction with the select offer is consummated. If the user fails to select an offer, then a transaction with the lowest received offer is consummated. Finally, if only one offer is received and it is below the reserve price, then a transaction with the single received offer is consummated.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

Notation and Nomenclature

A method and system for conducting Internet commerce is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the World Wide Web (WWW) and HyperText Transport Protocol (HTTP) technology. However, the same techniques can easily be applied to other types of electronic information distribution systems.

The detailed description of the present invention in the following are presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art. The present invention is a method and system for performing electronic commercial transactions. The method along with the system to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

Internet Commerce

Internet based commerce has been one of the fastest growing industries in the late $20^{th}$ Century. Such a large number of Internet based retailers have launched that a consumer may purchase almost any desired service or product from stocks & bonds to pet food. Traditional store based retailers have been pressured to offer some type of Internet based commerce system in order to compete with a large contingent of upstart "Internet only" retailers.

The Electronic Commerce Framework

Figure 1:
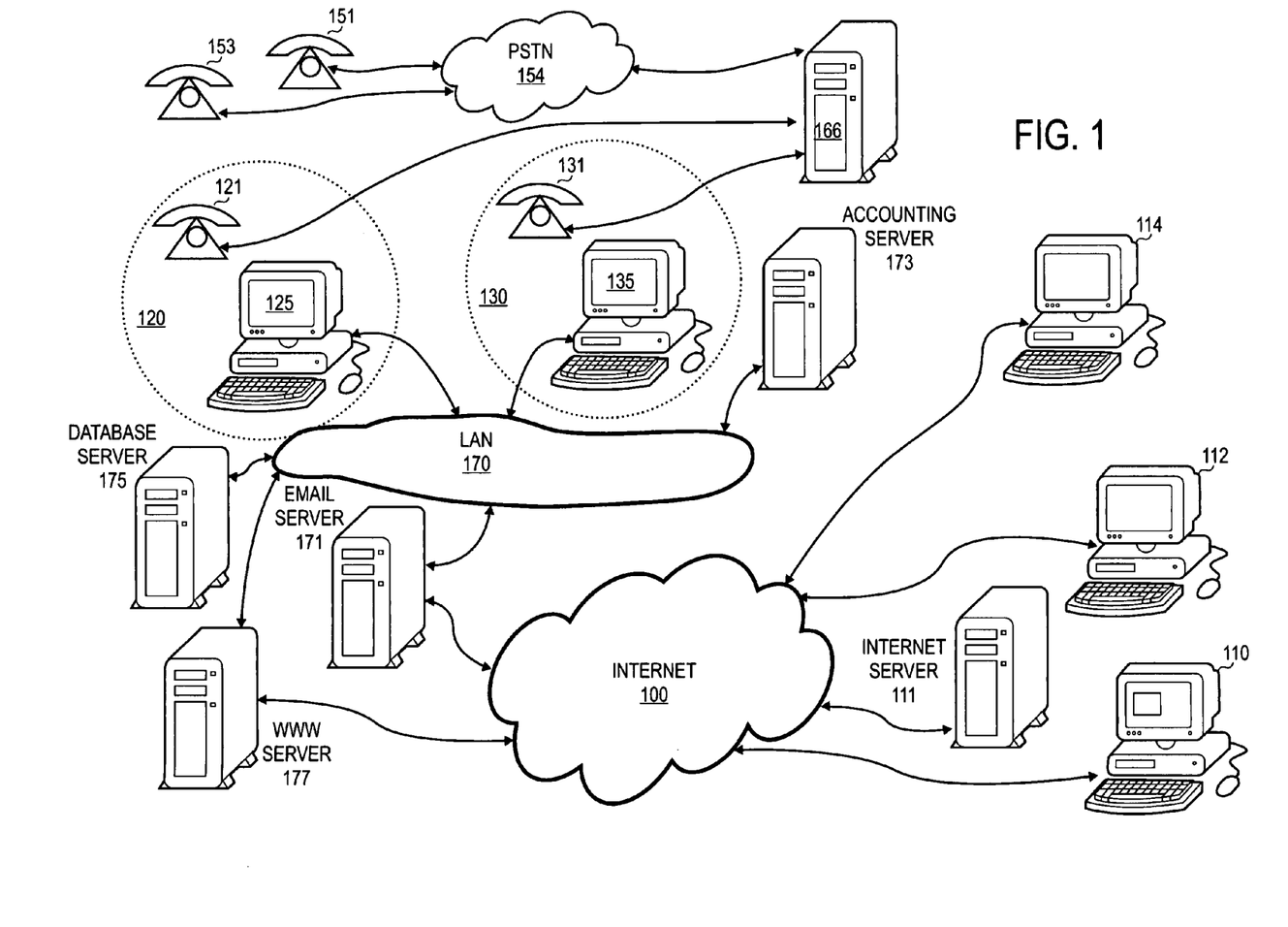
FIG. 1 illustrates a conceptual diagram of Internet commerce.

FIG. 1 illustrates a conceptual diagram of World Wide Web based electronic commerce in which the present invention may be practiced. FIG. 1 illustrates a data network 104 that comprises a plurality of client systems, such as personal computers 110 and 112, and a number of information server computers such as web server 177 and Internet server 111. In a preferred embodiment, the data network 104 is the global Internet. The client computer systems 110 and 112 may execute a Web browser such as Netscape's Navigator or Microsoft's Internet Explorer in order to communicate with servers on the data network 104.

The communication protocol of the World Wide Web (WWW) portion of the Internet 104 is the well known HyperText Transport Protocol (HTTP) or HTTPS, a secure version of HTTP. HTTP is used to transfer information in forms such as HTML or XML (extensible Markup Language) between web servers (111 and 177) and client computers 110 and 112.

One very simple method of providing electronic commerce is to create a call center staffed with several agents that handle customer purchase requests. FIG. 1 illustrates two agent workstations 120 and 130. The agent workstations may include a telephone (121 and 131) and computer system (125 and 135). The telephones may be coupled to a telephone switch 166 that may be a Private Branch Exchange (PBX), an automatic call distributor (ACD), or other appropriate telephony device. In the embodiment of FIG. 1, the telephone switch 166 may communicate with any phone on the public switched telephone network 154. Agents at the agent workstations 120 and 130 can handle calls from purchasers and handle their purchase requests. The agent may enter information about customer transactions into computer system coupled to the LAN 170 such as accounting server 173, database server 175, or any other system as appropriate. However, note that this simple electronic commerce system is labor intensive in that human agents are needed to conduct transactions with purchasers.

A more efficient method of providing electronic commerce services is to provide a site on the World Wide Web that handles electronic commerce. FIG. 1 illustrates a web server 177 that may host an electronic commerce web site. To conduct an electronic commerce transaction, a purchaser at a client computer system (110 or 112) on the Internet 104 may access the web server 177 to locate and purchase offered products and services. After a purchased has placed an order on web site 177, the web server 177 sends commands to effectuate the transaction to accounting server 173, database server 175, or any other system as appropriate.

First Generation Electronic Commerce

The initial Internet retailers basically consisted of Internet based catalog stores. A consumer browsed through a set of items available for purchase and informed the Internet retailer when the consumer desired to purchase an offered item. The Internet retailer sites have evolved to offer search facilities to help consumer locate a desired item and automatic suggestion systems that track a particular consumer's interest and suggest items for purchase.

Second Generation Electronic Commerce

A next generation of Internet retailers developed new methods of using Internet and computer technology to change the basic market system. As previously set forth, eBay (http://www.ebay.com/) has created a large auction site that matches large numbers of individuals with unique items to sell with large numbers of purchasers. The standard "highest bidder wins" auction format allows bidders to set the market price for an item.

Priceline.com, Inc. (http://www.priceline.com/) introduced a new method of selling excess inventory. In the Priceline.com system, a customer specifies a price that the customer is willing to pay for a loosely defined service such as a hotel room or an airline flight between two cities. The priceline.com system then attempts to locate a service supplier that will fulfill the desired service for a price below the customer's specified price. If a match is found, then priceline.com secures the deal and keeps the difference between the customer's stated price and the service provider's price.

Reverse Auction Electronic Commerce

The present invention introduces new methods creating an electronic marketplace. In the method and system of the present invention, a purchaser selects a well-defined product such as a particular brand and model of television set. The purchaser's product request is then provided to a registered set of approved product distributors. In one embodiment, all the approved product distributors have committed to certain defined service levels. The approved product distributors then compete for the business of the purchaser by attempting to offer the lowest price to the customer. Thus, the system of the present invention is similar to the reverse auction system.

The present invention defines several different models of this reverse auction like market system for use on an Internet based electronic commerce web site. A first model is a "Regular Bid" system wherein distributors openly compete with each other for business. Three other implementations are a "Reserve Request" model wherein the purchaser then specifies a price that he is willing to pay for the well-defined product and each approved product distributor is invited to make only one bid for a particular customer's business. The primary focus of this document is on the "reserve request" implementations, the regular reverse auction will be described to introduce the basic reverse auction format.

Regular Reverse Auction Transactions

Figure 2:
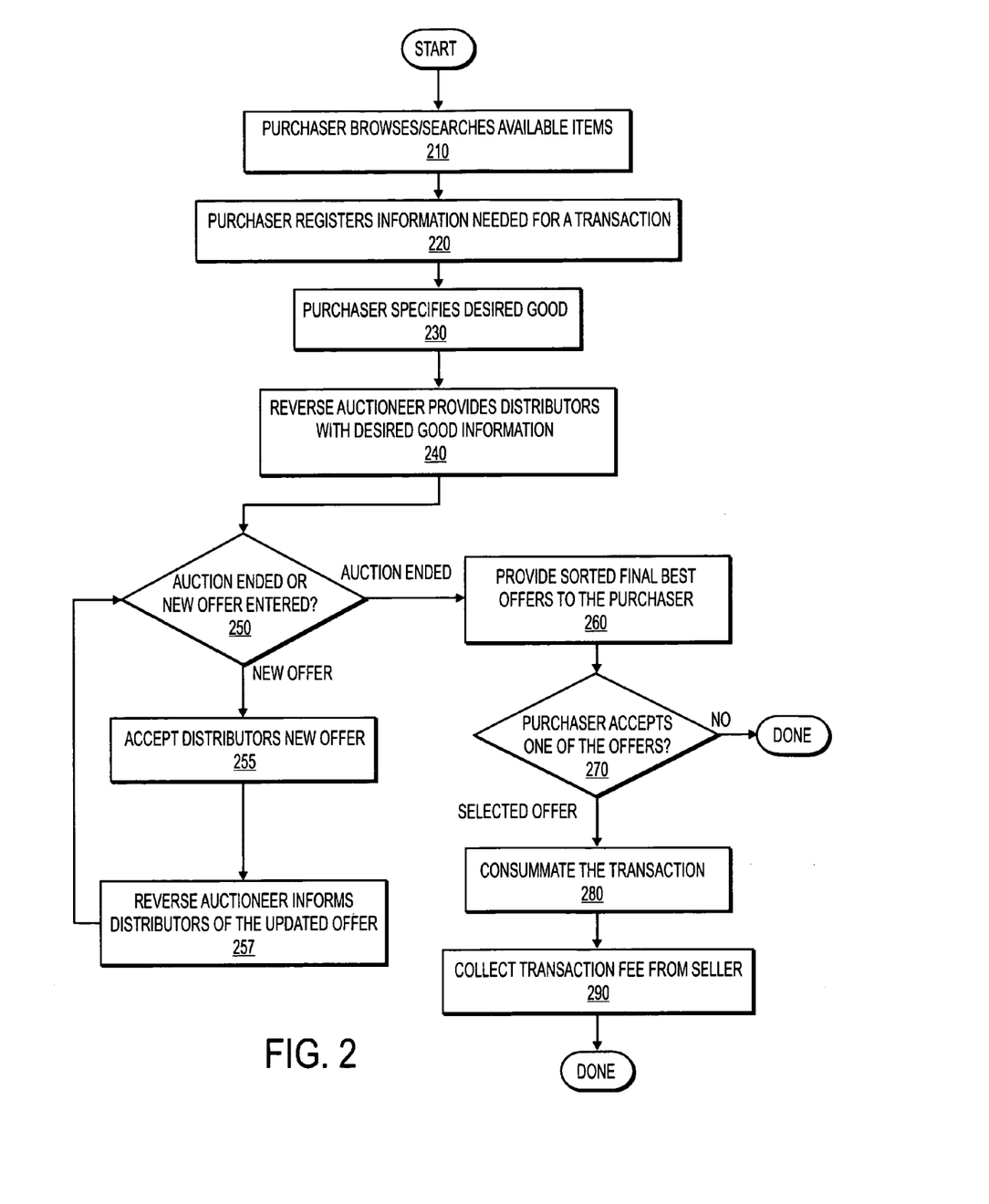
FIG. 2 illustrates a flow diagram of a regular bid reverse auction.

FIG. 2 illustrates the basic flow of a regular bid auction. In a regular bid transaction according to the teachings of the present invention, a purchaser first selects a well-defined product from a specific catalog of products as set forth in step 210. The catalog of products may be organized into a hierarchical virtual catalog system. Furthermore, a purchaser may search the entire virtual catalog system looking for a particular product by model number, brand, item type, model number, or any other identifier associated with the particular product.

If a consumer would like to purchase a defined item, the consumer must register with the reverse auction system as set forth in step 220. Specifically, the consumer provides information needed to complete a transaction with the reverse auction service such. Note that steps 210 and 220 may be reversed since a purchaser may register before browsing. Furthermore, once a purchaser has registered with the reverse auctioneer, the purchaser does not ever need to register again. Once registered, the consumer may engage in transactions with the reverse auction service.

After a consumer has selected a particular well-defined product for purchase and registered with the reverse auctioneer, the consumer confirms the selection of the well-defined product that is desired as set forth in step 230. In one embodiment, the purchaser may also specify a desired price.

The reverse auction for the Regular Bid transaction begins by informing a set of approved distributors of the consumer's desired purchase at step 240. The reverse auctioneer may inform the various approved product distributors using various different electronic communication means such as email, a web site, or other means of electronic data exchange. The reverse auctioneer informs the various approved product distributors of the specified desired product. In one embodiment, the reverse auctioneer may further supply the buyer's specified price. However, the approved distributors are not given the buyer's specific contact information such that the buyer is not bothered nor can the distributor cut the reverse auction provider out of the transaction.

Each distributor will analyze its own specific situation and determine a price that the distributor is willing to offer. As previously set forth, one embodiment requires that the price include all tax and shipping charges. Furthermore, the distributor should take into account the transaction fee that will be paid to the reverse auctioneer. The distributors can view the previously offered distributors prices such that the current market situation is known. When a distributor decides to enter an offer, the method proceeds through step 250 to step 255 where the reverse auctioneer accepts the offer entered by the distributor. If the offer entered by the distributor exceeds the current lowest offer price, then the reverse auctioneer may simply reject that offer. The reverse auctioneer updates the current offered prices as set forth in step 257 (provided that the offer was accepted). As the bidding process continues, the various approved product distributors may offer successively lower prices. Thus, by showing all the approved product distributor offered prices and allowing the distributors to re-bid, the distributors actively compete for the business of the purchaser.

The regular bid reverse auction remains open for specified amount of time (such as 48 hours.) Eventually, the reverse auction will end as set forth in step 250. The consumer is then provided with a sorted list of the best offers presented by the various distributors as set forth in step 260.

The consumer must then select one of the offers or decide not to purchase as set forth in step 270. Note that the consumer does not have to actively track the reverse auction such that the consumer obtains a low price without any of the work required in haggling for a desired price. If the consumer decides not to accept any of the offers, the reverse auction has ended and the offers are no longer valid.

If the consumer selects one of the approved product distributors' offers, then the reverse auctioneer consummates the transaction using the information supplied by both the consumer and the distributor as set forth in step 280. The reverse auctioneer collects a transaction fee as set forth in step 290. The transaction fee may be calculated using a fixed amount, a flat percentage, a scaled percentage, or any other formula.

Reserve Request Reverse Auction Transactions

The present invention introduces several different types of "reserve request" bids that may be used to implement modified reverse auctions. The basic tenet of the "reserve request" reverse auction models is that a purchaser specifies a reserve price that the purchaser is committed to honor. Specifically, if any approved product distributor specifies a price at or below the specified reserve price then the purchaser must purchase the specified product.

First Reserve Request Reverse Auction Implementation

Figure 3A:
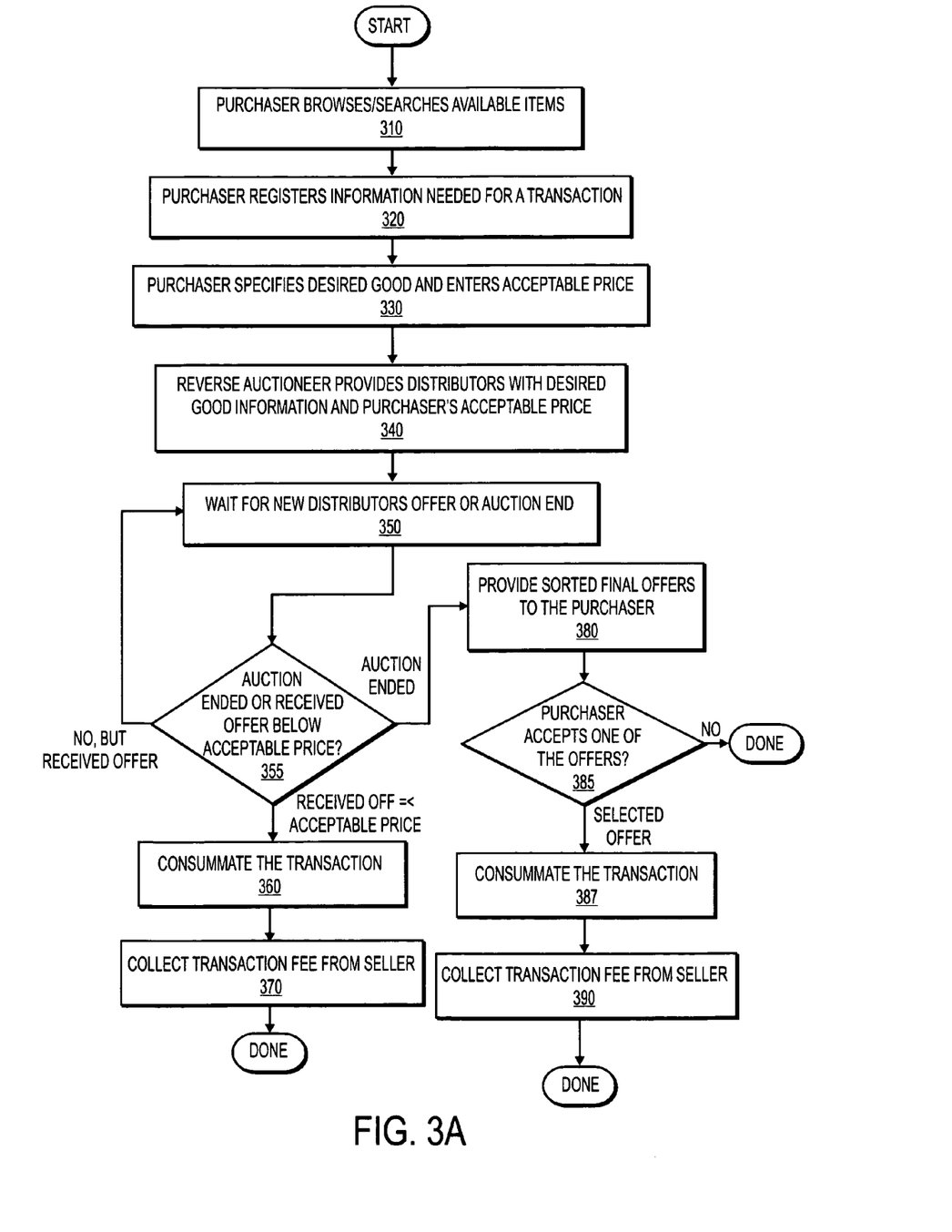
FIG. 3a illustrates a flow diagram of a first embodiment of a reserve request bid type of reverse auction.

FIG. 3a illustrates a flow diagram describing a first embodiment of a reserve request reverse auction. Referring to FIG. 3a, the initial steps of having a purchaser browse 310, collecting purchaser information 320, and accepting a price from the purchaser 330 are the same as in the previously described regular bid model except that the purchaser must specify a reserve price. The purchaser will be committed to purchase the selected product if a price equal to or less than the reserve price is offered by an approved product distributor.

The reverse auctioneer then presents the desired product information and the purchaser specified reserve price value to the approved product distributors at step 340. However, the approved distributors are only allowed to submit one offer price. The offer is submitted without the benefit of being able to see the offers from the other distributors participating in the reserve request reverse auction. The reserve request reverse auction will be open for a limited time period. The time period of a reserve request reverse auction may be set to any reasonable amount.

At steps 350 and 355, the reverse auction waits for qualifying offers from distributors or the reserve request auction to end. Until the auction ends or an offer below the reserve price is received, the reverse auctioneer continues to collect bids in the reserve request reverse auction.

If an approved product distributor submits an offer that at or below the purchaser's acceptable price, then the reverse auctioneer ends the reserve request reverse auction and consummates the transaction at step 360. The reverse auctioneer also collects the transaction fee at step 370.

If the reserve request reverse auction ends without an offer below the acceptable price, then the purchaser is provided with a sorted list of the best offers presented by the various distributors as set forth in step 380. The purchaser must then select one of the offers or decide not to purchase as set forth in step 385. If the purchaser decides not to purchase, the reserve request reverse auction has ended and the offers are no longer valid. If the purchaser selects one of the offers from the approved product distributors, then the reverse auctioneer consummates the transaction using the information supplied by both the purchaser and the selected approved product distributor as set forth in step 387. The reverse auctioneer collects a transaction fee as set forth in step 390.

Second Reserve Request Reverse Auction Implementation

Figure 3B:
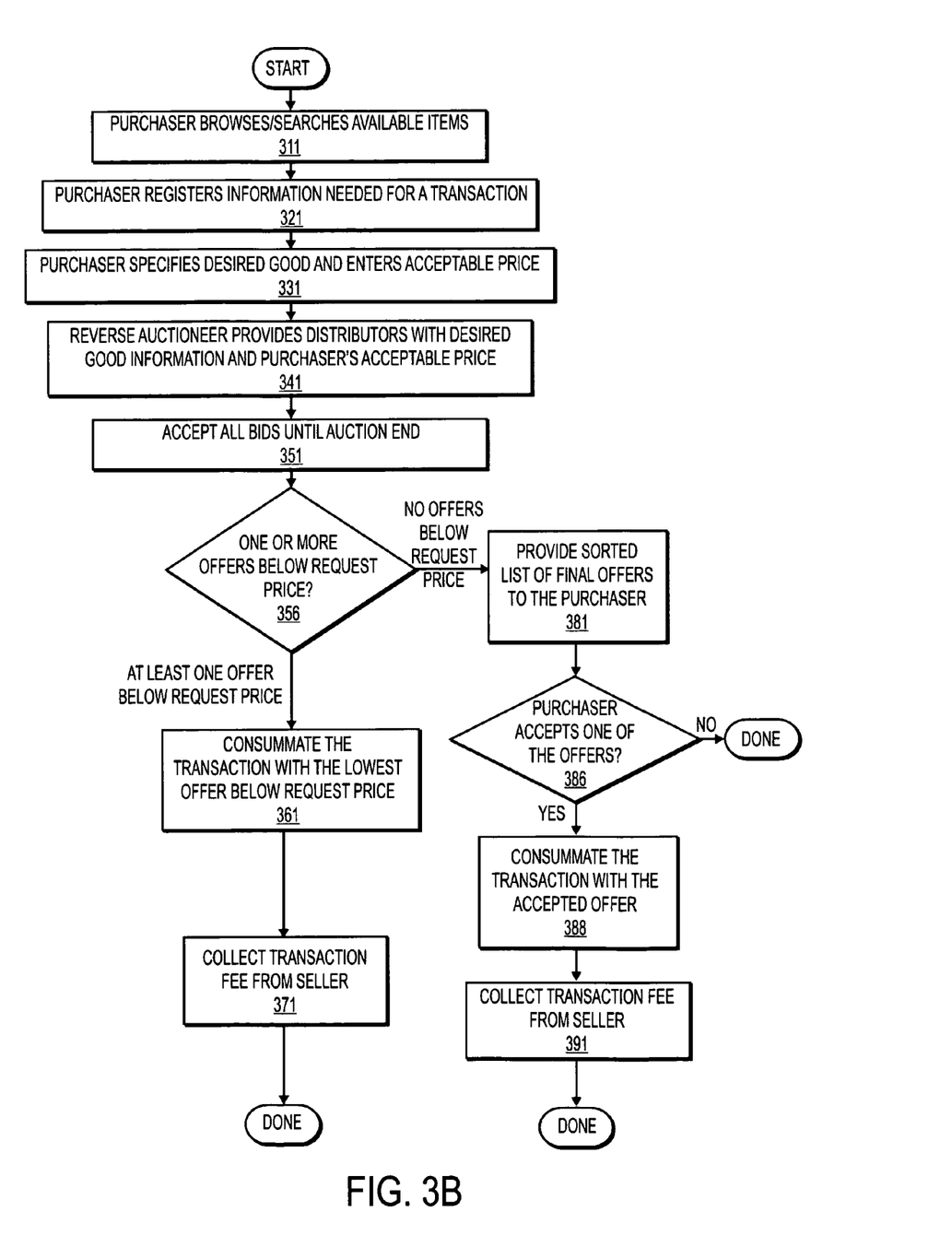
FIG. 3b illustrates a flow diagram of a second embodiment of a reserve request bid type of reverse auction.

FIG. 3b illustrates a flow diagram describing a second embodiment of a reserve request reverse auction. Referring to FIG. 3b, the initial steps of having a purchaser browse for a desired product 311, collecting purchaser information 321, and accepting a price from the purchaser 331 are the same as in the previously described reserve request bid model. Again, the purchaser will be committed to purchase the selected product if a price equal to or less than the reserve price is offered by an approved product distributor.

The reverse auctioneer then presents the desired product information and the purchaser specified reserve price value to the approved product distributors at step 341. Again, the approved distributors are only allowed to submit one offer price. The offer is submitted without the benefit of being able to see the offers from the other distributors participating in the reserve request reverse auction. The reverse auctioneer continues to accept bids at step 351 for a period of time. The duration of a reserve request reverse auction may be set to any reasonable amount.

After the reserve request auction has ended, the reverse auctioneer determines at step 356 if an approved product distributor has submitted an offer that is equal to or less than the purchaser's reserve price. If there is at least one offer from an approved product distributor that is equal to or less than the purchaser's reserve price, the method proceeds to step 361 to consummate the offer. Normally, the lowest offer is selected. If there are two or more equal lowest offers, then the lowest bid offer was submitted first in time is designated as the "winning" offer. The reverse auctioneer also collects the transaction fee at step 371.

If the reserve request reverse auction ends without an offer below the acceptable price, then the purchaser is provided with a sorted list of the best offers presented by the various approved product distributors as set forth in step 381. The purchaser may then select one of the offers or decide not to purchase as set forth in step 386. If the purchaser decides not to purchase, the reserve request reverse auction has ended and the offers are no longer valid. If the purchaser selects one of the offers from the approved product distributors, then the reverse auctioneer consummates the transaction using the information supplied by both the purchaser and the selected approved product distributor as set forth in step 388. The reverse auctioneer collects a transaction fee as set forth in step 391.

Third Reserve Request Reverse Auction Implementation

Figure 3C:
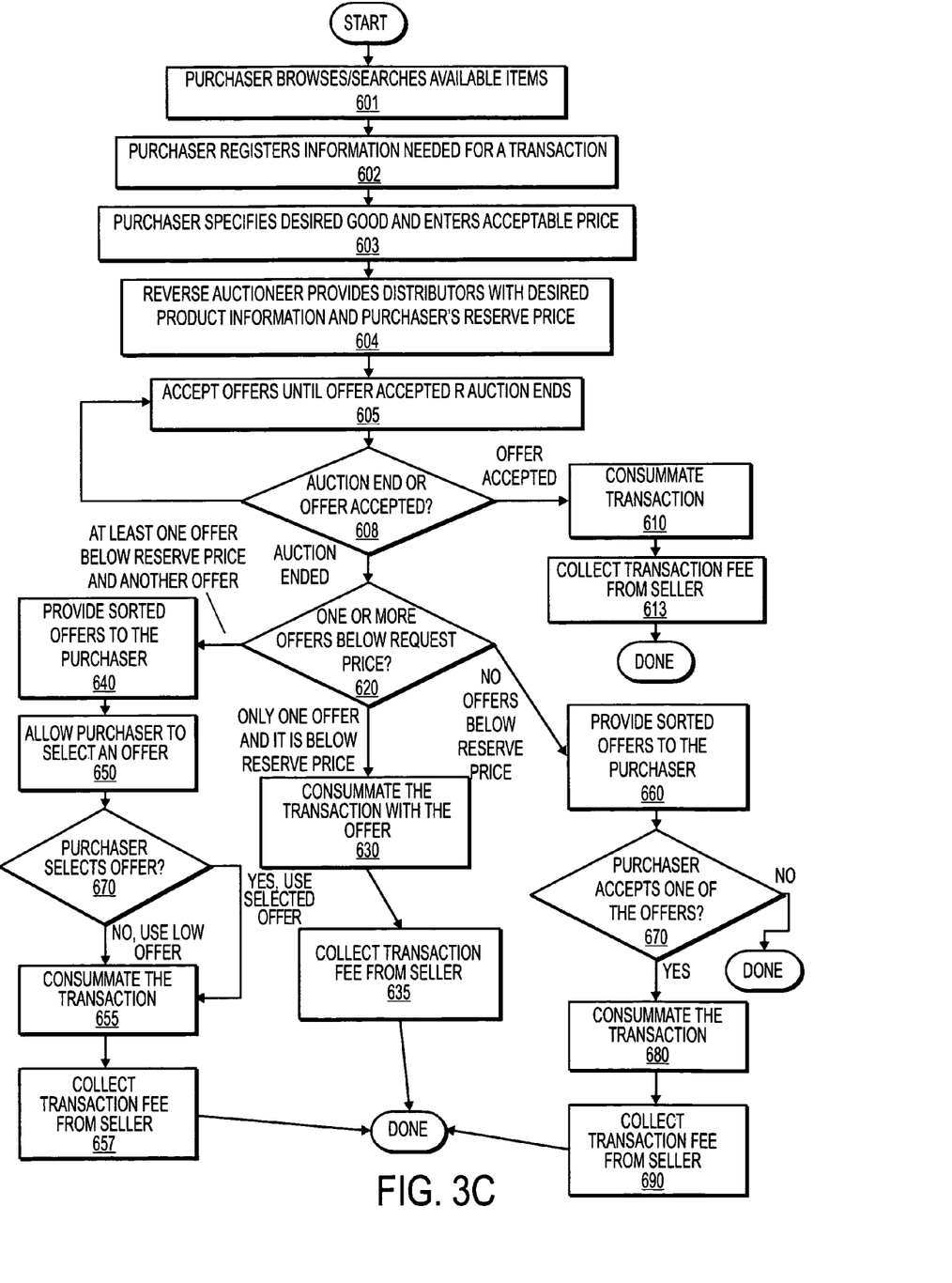
FIG. 3c illustrates a flow diagram of a third embodiment of a reserve request bid type of reverse auction.

FIG. 3c illustrates a flow diagram describing a third embodiment of a reserve request reverse auction. Referring to FIG. 3c, the initial steps of having a purchaser browse for a desired product 601, collecting purchaser information 602, and accepting a price from the purchaser 603 are the same as in the previously described reserve request reverse auction implementations of FIGS. 3a and 3b. The purchaser will be committed to purchase the selected product if a price equal to or less than the reserve price is offered by an approved product distributor.

The reverse auctioneer then presents the desired product information and the purchaser specified reserve price value to the approved product distributors at step 604. Each approved product distributor is only allowed to submit one offer price. Each approved product distributor offer is submitted without the benefit of being able to see the offers from the other approved product distributors participating in the reserve request reverse auction.

Referring next to step 605, the reserve request reverse auction of FIG. 3c remains open until the purchaser accepts an offer or a time limit for the reserve request reverse auction expires. The reserve request reverse auction time limit may be set to any reasonable amount.

If the purchaser accepts an offer before the time limit for the reserve request reverse auction expires, the system proceeds to step 610 to consummate the transaction for the accepted offer. Thus, the purchaser is able to end the auction at any time an acceptable offer has been presented. After consummating the transaction at step 610, the reverse auctioneer collects the transaction fee from that seller at step 613 to complete the transaction.

If the auction time limit expires before having the purchaser accept an offer, the system proceeds to step 620 to consider the received offers. How the system will proceed will depend on the offers that were received.

If there are no offers below the purchaser's reserve price, the system presents the purchaser with a sorted list of the offers presented by the various approved product distributors as set forth in step 660. The purchaser may then select one of the offers or decide not to purchase as set forth in step 670. If the purchaser decides not to purchase, the reserve request reverse auction has ended and the offers are no longer valid. If the purchaser selects one of the offers from the approved product distributors, then the reverse auctioneer consummates the transaction using the information supplied by both the purchaser and the selected approved product distributor as set forth in step 680. The reverse auctioneer collects a transaction fee as set forth in step 690.

If there is at least one offer below the purchaser's reserve price and at least one other offer (above or below the purchaser's reserve price), the system presents the purchaser with a sorted list of the offers presented by the various approved product distributors as set forth in step 640. The purchaser is then allowed to select one of the offers during a predetermined time period as set forth in step 650. Often purchasers will select higher priced offers from local merchants in order to speed delivery or simplify returns.

Referring to step 670, if the purchaser selects a particular offer within the predetermined time period, then the system will use that selected offer as the transaction to consummate. If the purchaser does not select a particular offer within a predetermined time period, then the system will use the lowest offer as the transaction to consummate. The reverse auctioneer then consummates the transaction (the user selected offer or the low offer) using the information supplied by both the purchaser and the selected or lowest approved product distributor as set forth in step 655. The reverse auctioneer collects a transaction fee as set forth in step 657.

Referring back to step 620, if only one offer was received and that one offer was below the purchaser's reserve request price, then that offer is used to consummate the transaction. Specifically, in such a situation the system proceeds to step 630 wherein the reverse auctioneer consummates the transaction with the single offer using the information supplied by both the purchaser and the that approved product distributor that offered a price below the purchaser's reserve price as set forth in step 630. The reverse auctioneer also collects a transaction fee as set forth in step 635.

Implementation Details

Figure 4:
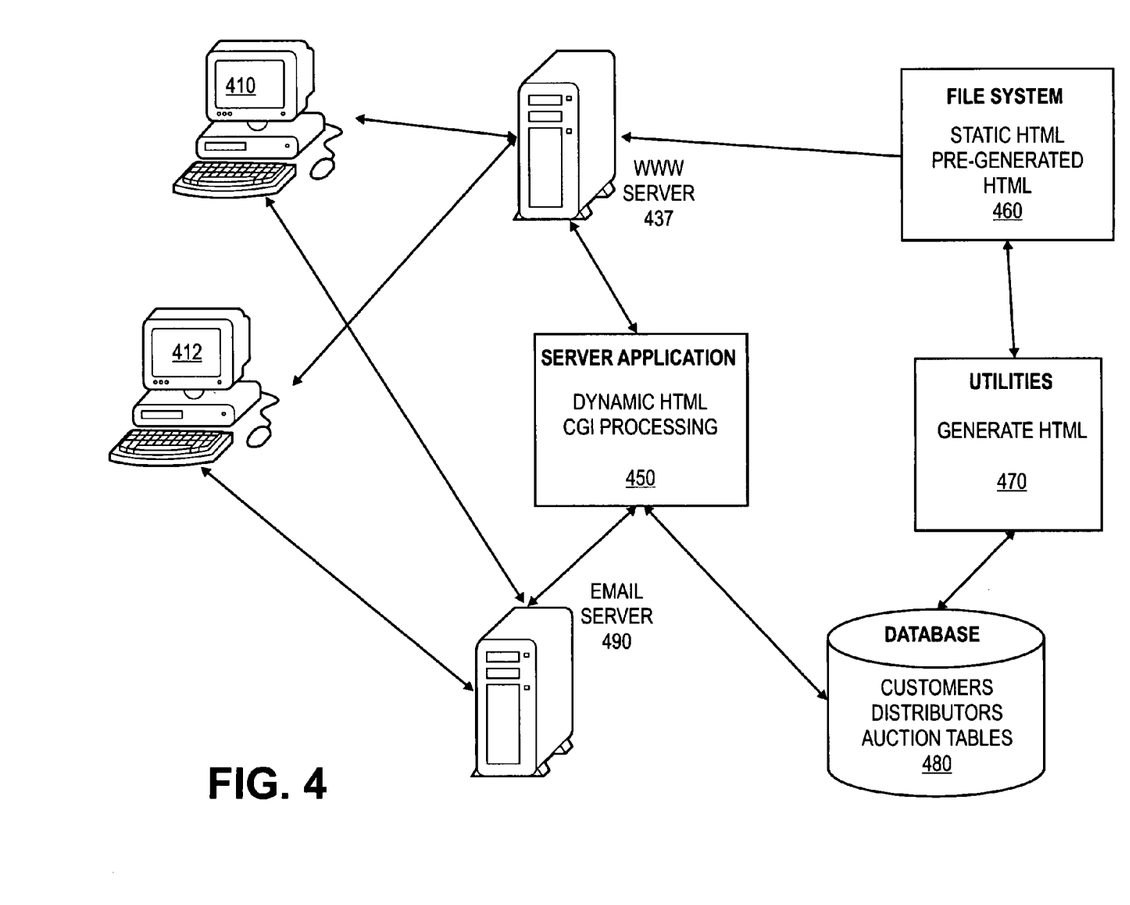
FIG. 4 illustrates one possible implementation of a reverse auction web site.

FIG. 4 illustrates one possible implementation of a World Wide Web (WWW) based reverse auction system. In the embodiment of FIG. 4, a WWW server 437 interacts with client computer system 410 and 412 across the Internet. The server 437 may be any standard WWW server. Many of the web pages served by WWW server 437 may be static web pages that have been created by web designers. Other web pages may be automatically pre-generated by utilities 470 that generate HTML web pages from database content. For example, utilities 470 may be used to pre-generate web pages for each product in the product database (productDB). The static web pages and pre-generated web pages may be stored in file system 460 for fast access.

When the reverse auction system needs to obtain information from a client computer system (such as 410 or 412), the WWW server 437 may server a web page with an HTML form. When the client system returns the form, the server application 450 processes the form to extract the data. For example, when a consumer registers with the reverse auction system, the consumer will enter identification and credit information into an HTML form. The completed form will be passed back to the WWW server 437 with a secure connection. For example, a Secure Socket Layer (SSL) connection may be used to transport the completed form. The WWW server 437 will pass the form information to server application 450. The server application 450 processes the form to obtain the needed data.

The server application 450 may store the extracted data into a database 480. In one embodiment, the database 480 is an RDBMS database system. The database 480 may comprise many different distinct databases. The databases may include ProfileDB: The ProfileDB contains profile data about all the users of the system (including buyers, sellers, and administrative users). The profile will include typical contact information such as name, username, password, authentication information, address, telephone numbers, etc. For buyers, the profile may also include credit information, browsing history, buying history, and other information. For sellers, the profile may also include authorizations, subscriptions, agent configuration parameters, business models selected, reporting preferences, etc.

NeedDB/BidDB: The NeedDB stores information on needs listed for the various auctions. BidBD contains appropriate information about active seller bids for the various active auctions.

OrderDB: Contains information about all the orders placed by buyers, processed by sellers, the order status, historical information, and other information.

Product DB: Holds the entire product catalog containing information about all the products available for purchase. The Product DB further includes domain specific rules used by cross-selling systems, information needed to render "paid" content such as advertising.

HistoryDB: Contains historical and audit information about needs listed, bids against the needs, orders processed, audit of operations, and other historical information needed for detailed analysis of buyer and seller behavior.

AdminDB: The AdminDB is the repository of frequent buyer program information, browse and grouse corners, and administrative parameters to control the run-time management of the reverse auction web site and servers, reports and reporting parameters.

The server application 450 also dynamically generates HTML pages in response to user actions. The server application 450 passes the dynamically generated HTML pages to the WWW server 437 such that such pages may be displayed to the browsers accessing the WWW server 437.

The server application 450 may further interact with consumers and sellers via email. Specifically, the server application 450 may generate email messages to send out and then pass those generated email messages to email server 490. The email server 490 relays the generated mail messages to the appropriate destinations.

Server Application

Figure 5:
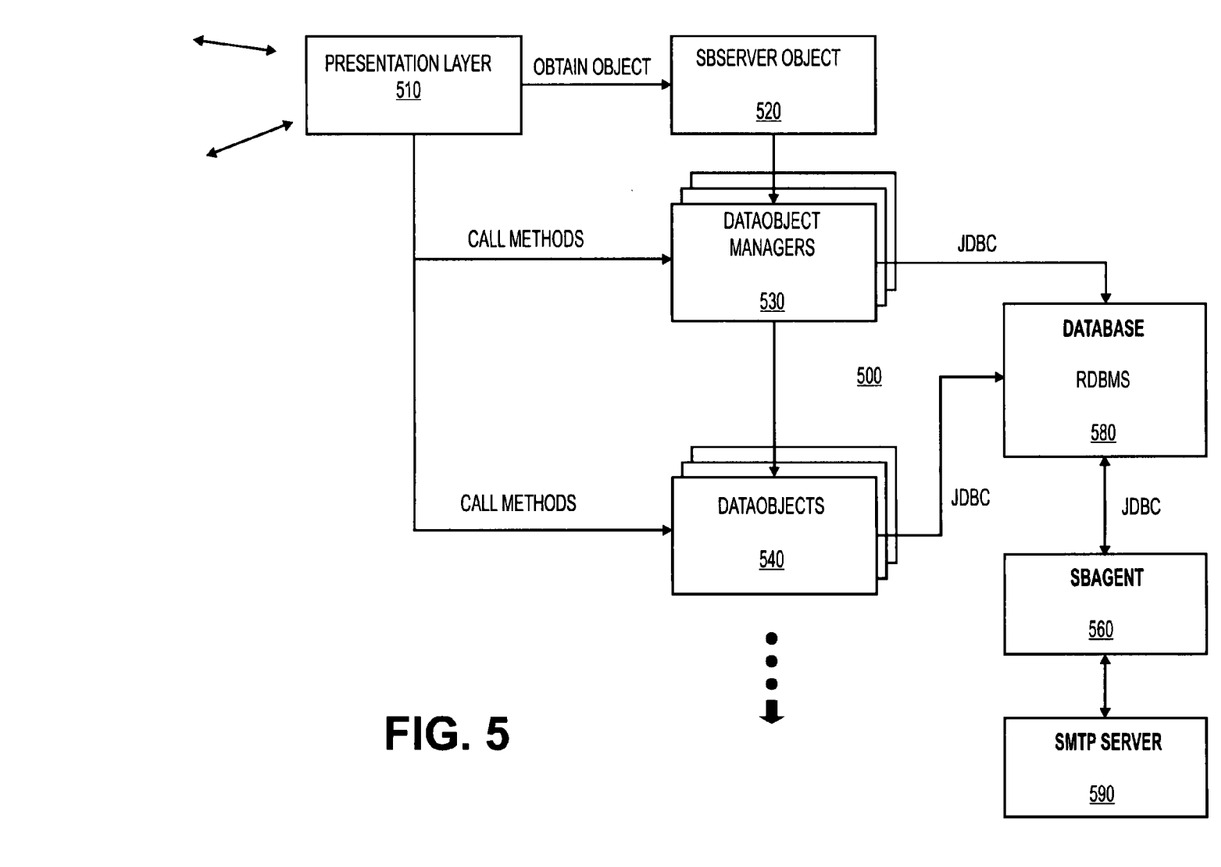
FIG. 5 illustrates one possible implementation of a server application for the reverse auction web site.

As set forth in the previous section, the server application 450 performs much of the custom operations for the reverse auction system. This section further defines the operation of the server application 450. FIG. 5 illustrates a conceptual diagram of one embodiment of the server application. The particular embodiment of the server application 500 in FIG. 5 has been coded in Java. However, any other programming language and environment may be used.

Referring to FIG. 5, the server application 500 has a presentation layer 510 that interacts with the web server for the reverse auction system. The presentation layer 510 receives requests from browsers accessing the reverse auction web site and handles those requests. The presentation layer 510 handles such requests by making calls into other components and formulates dynamic HTML pages for responses.

The presentation layer 510 accesses several data objects to help perform its processing functions. In one embodiment, each of the various business entities has its own object type. For example there is a Buyer object for the buyer entity, a Request object for the request entity, and a Bid object for the bid entity. The data objects provide an object representation to encapsulate the data in the relational table in the database. In additional, there are corresponding "manager" objects that create, instantiate, search, and destroy data objects. For example, FIG. 5 illustrates a set of DataObject managers 530 that each manages a particular type of data object. FIG. 5 further illustrates a set of DataObjects 540 that are managed by the DataObject managers 530. The various DataObject managers 530 and DataObjects 540 make references to the database 580. The references may be made with Java DataBase Calls (JDBC).

There is also a set of processing objects (not shown). The processing objects run in the background and process various incoming events such as a new request, a new submitted offer, an auction closing, or any other incoming event.

The foregoing has described an electronic commerce based reverse auction system. It is contemplated that changes and modifications may be made by one of ordinary skill in the art, to the materials and arrangements of elements of the present invention without departing from the scope of the invention.

I claim:

1. A computer implemented method of performing electronic commerce, said computer implemented method comprising:

listing a set of available products to a set of consumers via a Web page of a Web server for online auction;

accepting a request for a specific product from a particular consumer via the Web page over a network;

accepting a reserve price for said specific product from said particular consumer, said reserve price comprising a price acceptable to said particular consumer;

distributing said request for said specific product and said reserve price to a set of sellers over the network;

accepting at most one offer from each said seller in said set of sellers, each said offer comprising an offer price specifying a price at which an associated seller will sell said specific product, said accepting occurring for a predetermined time period or until an offer having an offer price less than or equal to said reserve price is received;

if there is only one offer having an offer price less than or equal to the reserve price, consummating, without intervention from the consumer, a transaction with said offer having an offer price less than or equal to said reserve price if said offer having an offer price less than or equal to the reserve price is received;

if there are multiple offers having an offer price less than to the reserve price presenting to the consumer the multiple offers sorted in a predetermined order to allow the consumer to select one offer from the multiple offers;

consummating a transaction with an offer selected by the consumer if the consumer selects from the multiple offers; and consummating a transaction with an offer having a lowest price from the multiple offers if the consumer does not select from the multiple offers.

2. The computer implemented method as claimed in claim 1 wherein listing a set of available products comprising operating a World Wide Web site with a catalog of products.

3. The computer implemented method as claimed in claim 2 wherein said catalog of products is searchable.

4. The computer implemented method as claimed in claim 2 wherein said World Wide Web site comprises a hierarchical directory of products.

5. The computer implemented method as claimed in claim 1 wherein accepting a request for a specific product from a particular consumer comprises receiving an HTML form.

6. The computer implemented method as claimed in claim 1 wherein distributing said request for said specific product to a set of sellers comprises creating a web page that specifies said request for said specific product and said reserve price.

7. The computer implemented method as claimed in claim 1 wherein distributing said request for said specific product to a set of sellers comprises sending an email to at least one seller that specifies said request for said specific product and said reserve price.

8. The computer implemented method as claimed in claim 1 wherein accepting offer prices from sellers comprises receiving an email that specifies an offer price for said specific product.

9. The computer implemented method as claimed in claim 1 wherein accepting offer prices from sellers comprises receiving an HTML form page that specifies an offer price for said specific product.

10. The computer implemented method as claimed in claim 1, said computer implemented method further comprising:
displaying a subset of offers from said sellers to said particular consumer if none of said offers from said sellers are below said reserve price, the subset of offers being higher than the reserve price.

11. The computer implemented method as claimed in claim 10 wherein displaying the subset of offers comprises sending an email message specifying the subset of offers to said particular consumer.

12. The computer implemented method of claim 10, further comprising:
allowing, for a second predetermined time period, the particular consumer to select one of the subset of offers;
consummating a transaction between the particular consumer and a seller of the selected offer from the subset of offers during the second predetermined time period, if the particular consumer selects from the subset of offers; and
consummating a transaction between the particular consumer and a seller offering a lowest offer price if the particular consumer does not select from the subset of offers within the second predetermined time period.

13. The computer implemented method as claimed in claim 10 wherein displaying the subset of offers comprises generating a web page specifying the subset of offers.

14. The computer implemented method as claimed in claim 10, said computer implemented method further comprising:
receiving a designation of one of said offer prices from said particular consumer; and
consummating a transaction between said particular consumer and a seller that offered said designated offer price.

15. The computer implemented method as claimed in claim 14
wherein an identification information associated with said particular consumer is provided to said seller that offered said designated offer price only after said particular consumer has designated said seller.

16. The computer implemented method as claimed in claim 14
wherein an identification information associated with said seller that offered said designated offer price is provided to said particular consumer only after said particular consumer has designated said seller.

17. The computer implemented method as claimed in claim 1, said computer implemented method further comprising:
accepting a transaction fee after consummating said transaction.

18. The computer implemented method as claimed in claim 1, said computer implemented method further comprising:
accepting a consumer registration prior to accepting the request for the specific product from the particular consumer, said consumer registration comprising information from a consumer required to consummate a transaction between said consumer and a seller.

19. A machine-readable medium having executable code to cause a machine to perform a method for online auction, the method comprising:
listing a set of available products to a set of consumers via a Web page of a Web server for online auction;
accepting a request for a specific product from a particular consumer via the Web page over a network;
accepting a reserve price for said specific product from said particular consumer, said reserve price comprising a price acceptable to said particular consumer;
distributing said request for said specific product and said reserve price to a set of sellers over the network;
accepting at most one offer from each said seller in said set of sellers, each said offer comprising an offer price specifying a price at which an associated seller will sell said specific product, said accepting occurring for a predetermined time period or until an offer having an offer price less than or equal to said reserve price is received;
if there is only one offer having an offer price less than or equal to the reserve price, consummating, without intervention from the consumer, a transaction with said offer having an offer price less than or equal to said reserve price if said offer having an offer price less than or equal to the reserve price is received;
if there are multiple offers having an offer price less than to the reserve price presenting to the consumer the multiple offers sorted in a predetermined order to allow the consumer to select one offer from the multiple offers;
consummating a transaction with an offer selected by the consumer if the consumer selects from the multiple offers; and
consummating a transaction with an offer having a lowest price from the multiple offers if the consumer does not select from the multiple offers.

20. A data processing system, comprising:
a processor; and
a memory coupled to the processor for storing instructions, when executed from the memory, cause the processor to
list a set of available products to a set of consumers via a Web page of a Web server for online auction,
accept a request for a specific product from a particular consumer via the Web page over a network,
accept a reserve price for said specific product from said particular consumer, said reserve price comprising a price acceptable to said particular consumer,
distribute said request for said specific product and said reserve price to a set of sellers over the network,
accept at most one offer from each said seller in said set of sellers, each said offer comprising an offer price specifying a price at which an associated seller will sell said specific product, said accepting occurring for a predetermined time period or until an offer having an offer price less than or equal to said reserve price is received,
if there is only one offer having an offer price less than the reserve price, consummate, without intervention from the consumer, a transaction with said offer having an offer price less than or equal to said reserve price if said offer having an offer price less than or equal to the reserve price is received, if there are multiple offers having an offer price less than or equal to the reserve price, present to the consumer the multiple offers sorted in a predetermined order to allow the consumer to select one offer from the multiple offers, consummate a transaction with an offer selected by the consumer if the consumer selects from the multiple offers, and consummate a transaction with an offer having a lowest price from the multiple offers if the consumer does not select from the multiple offers.

* * * * *